Patented June 24, 1930

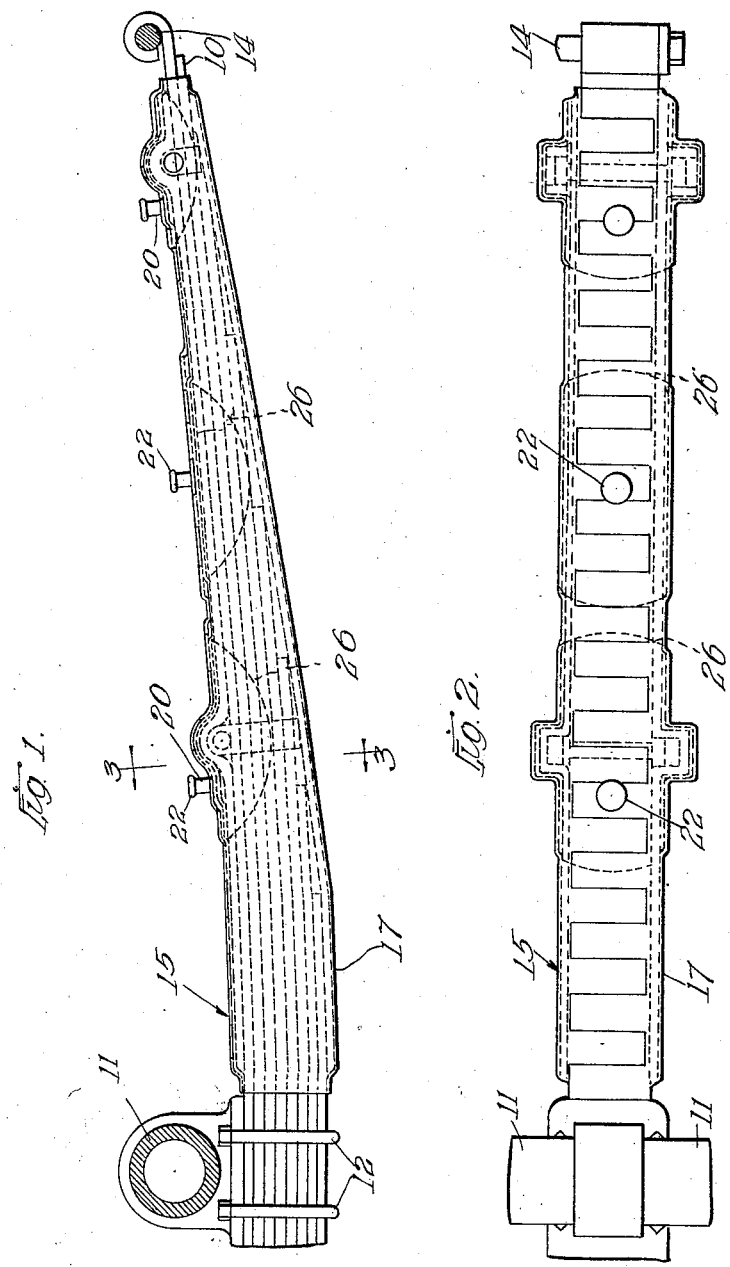

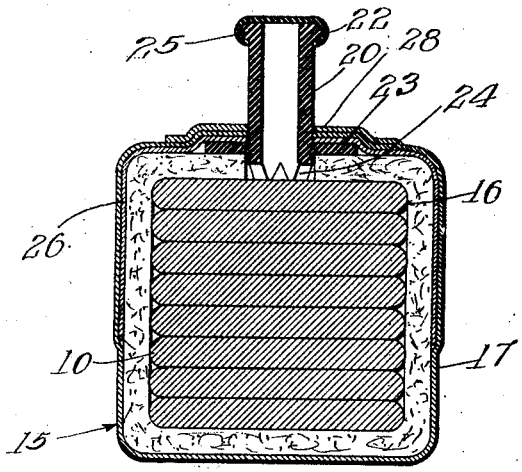
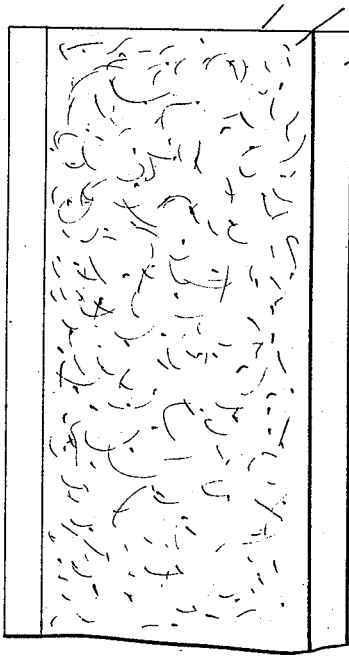
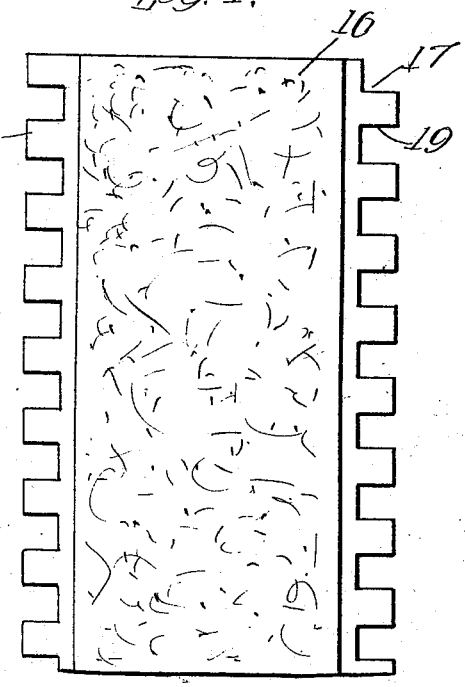

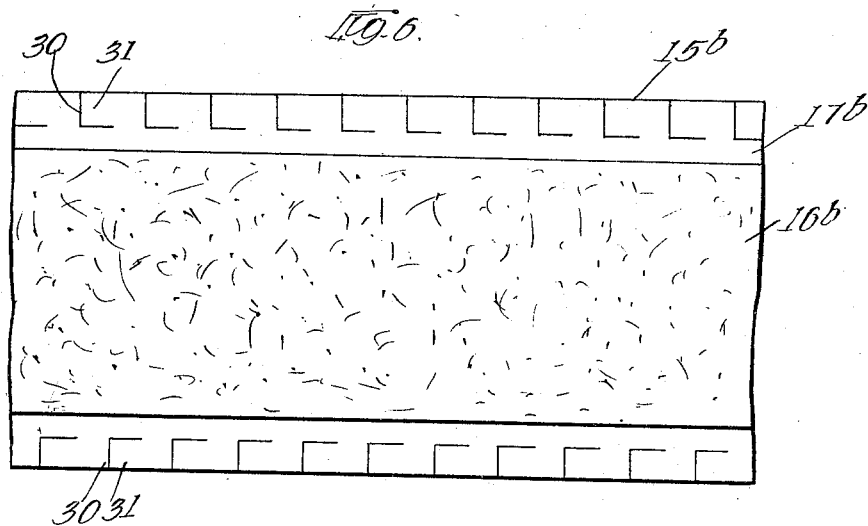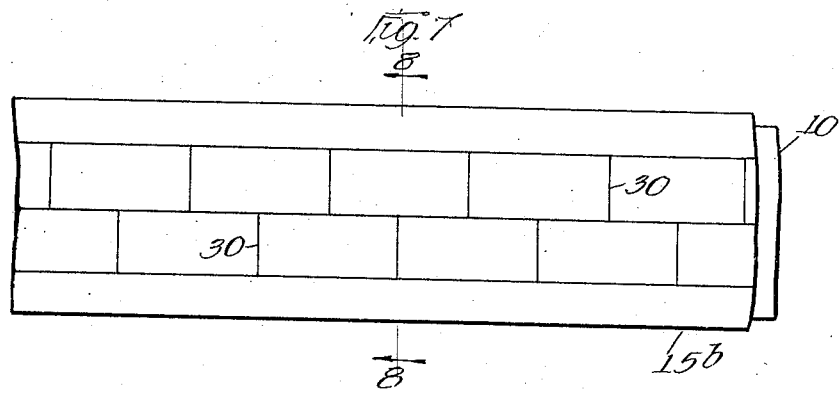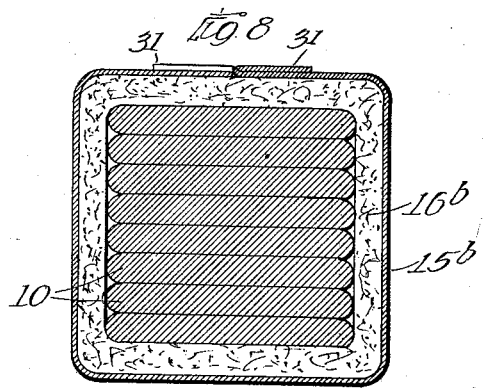

1,767,501

UNITED STATES PATENT OFFICE

CHARLES D. ANDERSON, OF CHICAGO, ILLINOIS

COVER

Application filed August 17, 1925. Serial No. 50,729.

My invention relates to covers and particularly to covers for vehicle springs. The invention has among its other objects the production of devices of the kind described, which are neat and attractive in appearance, convenient, compact, durable and satisfactory for use wherever found applicable.

I will hereinafter describe several forms of the invention, each form being particularly adapted to be used in connection with automobile springs of a well-known type. As illustrated, each cover may comprise an inner layer of felt or felted material adapted to be wrapped around the leaves of an automobile spring. The felt or felted material is preferably enclosed within a sheet of rubberized material which has an adhesive substance applied thereto in such manner that when the cover is wrapped around the spring the adhesive substance will secure the cover in place. The cover preferably comprises an oiling tube or tubes also formed of rubber or rubberized material. The lubricant may be applied to the springs through the oiling tubes. Obviously, the cover tends to retain the lubricant in the spring and tends to exclude dust therefrom.

Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

In the drawings, wherein like reference characters indicate like or corresponding parts:

Fig. 1 is a fragmentary elevation of an automobile spring to which a cover embodying the novel features of my invention has been applied;

Fig. 2 is a plan view of the apparatus shown in Fig. 1;

Fig. 3 is a section taken on line 3—3 of Fig. 1;

Fig. 4 is a fragmentary view of the cover as it appears before it is applied to a spring;

Fig. 5 is a fragmentary view of a cover embodying another form of the invention;

Fig. 6 is a fragmentary view of a cover embodying still another form of the invention;

Fig. 7 is a plan view of an automobile spring having the cover shown in Fig. 6 applied thereto; and Fig. 8 is a section taken on line 8—8 of Fig. 7.

Referring for the present to Figs. 1 to 4, inclusive, 10 is an automobile spring comprising a plurality of leaves which are secured to an axle 11 by U-bolts 12. The uppermost leaf of the spring 10 has one of its ends secured to a shackle bolt 14.

Wrapped around the spring 10 is a cover 15 embodying the novel features of my invention. The cover 15 preferably comprises an inner layer 16 of felt or other suitable material. The layer 16 is preferably enclosed within a sheet 17 of rubber or rubberized material. In some instances, I prefer to secure the layer 16 to the sheet 17 before the cover is applied to the spring 10. Thus, in Fig. 4 I have shown the layer 16 secured to the sheet 17 by any suitable adhesive substance or the equivalent. As shown, the sheet 17 may be formed with a plurality of laterally extending tabs 19, the tabs on one side of the sheet being staggered with respect to the tabs 19 along the other side thereof. Obviously, when the cover is wrapped around the spring the tabs 19 may be interlaced in the manner illustrated in Fig. 2, so that the tabs 19 of one side of the sheet will engage the marginal portion of the other side of the sheet. I preferably coat the tabs 19 with any suitable adhesive substance, such as rubber cement or a coating of unvulcanized rubber. Then, when the cover is wrapped around the spring, the adhesive on the tabs 19 will hold the cover in place.

A plurality of oiling tubes 20 may be provided, if it is so desired. The tubes 20 may be formed of any suitable material, but I prefer to form them from rubber or rubberized material. As shown in Fig. 3, each tube 20 is preferably formed with an annular bead 22 or the equivalent and with an annular flange 23 or the equivalent. The inner end of each tube 20 is preferably notched, as at 24, so that lubricant may flow from the tube to the leaves of the spring 10. Each tube is preferably provided with a closure member or cap 25 of resilient material which may be drawn over the bead 22. To assemble the tube 20 with the cover 15 I preferably insert the flange 23 of the tube between the layer 16 and the sheet 17, the layer 16 being cut or formed to permit the tube to project therethrough. The portion of the cover 15 through which the tube projects is preferably reinforced by a patch 26 which may also be inserted between the layer 16 and the sheet 17. In Fig. 3 I have shown the patch 26 provided with an aperture 28 which accommodates the tube 20.

In Fig. 5 I have shown another form of the invention in which a cover 15$^a$ comprises an inner layer 16$^a$ suitably secured to a sheet 17$^a$ of rubber or rubberized material. The inner layer 16$^a$ may be formed of felt or any other suitable material. It will be noted that the marginal portions of the sheet 17$^a$ are not provided with tabs. I preferably coat the inner surface of the marginal portions of the sheet 17$^a$ with a suitable adhesive, which may be employed to secure the cover in place upon a spring.

Referring now to Figs. 6 to 8, inclusive, wherein I have shown still another form of the invention, the reference character 15$^b$ designates in general a cover which may be used in place of the cover 15 shown in Figs. 1 to 4, inclusive. The cover 15$^b$ comprises an inner layer 16$^b$ of felt or felted material, the inner layer 16$^b$ being suitably secured to a sheet 17$^b$ of rubber or rubberized material. Each side edge of the sheet 17$^b$ is slit or cut, as at 30, to provide a plurality of tabs 31 which extend longitudinally of the sheet. The tabs 31 are so arranged that when the cover 15$^b$ is wrapped around the spring, the tabs interlock with each other in the manner illustrated in Fig. 7. The tabs 15$^b$ are preferably coated with an adhesive substance so that when the tabs are brought into the relative positions wherein they are shown in Fig. 7 they may be employed to secure the cover in place upon the spring.

Obviously, a cover embodying my invention may be quickly and easily wrapped around a spring to form a substantially integral dust-proof, water-proof and oil-proof cover therefor. In the preferred embodiments of the invention, it is unnecessary to tie the cover to the spring as the adhesive substance carried by the cover serves to firmly secure it in place upon the spring, but I am limited to the use of adhesive only to the extent defined in the appended claims.

Having thus described my invention, it is obvious that various immaterial modifications may be made in the same without departing from the spirit of my invention; hence I do not wish to be understood as limiting myself to the exact form, construction, arrangement and combination of parts herein shown and described or uses mentioned.

What I claim as new and desire to secure by Letters Patent is:

1. In a cover of the class described, the combination with a flexible sheet comprising rubber and provided with tabs, of a coating of adhesive substance applied to said tabs and adapted to secure the sheet upon a spring.

2. In a cover of the class described, the combination with a flexible sheet comprising rubber and provided with tabs, of a coating of adhesive applied to said tabs and adapted to secure the sheet around a spring, and a layer of fibrous material disposed within the sleeve for engagement with the spring.

3. In a cover of the class described, the combination with a flexible sheet comprising rubber, of a coating of rubber cement upon said sheet whereby the sheet may be secured around a spring, and a layer of fibrous material positioned upon the inner surface of said sheet and adapted to engage the spring.

4. In a cover of the class described, the combination with a flexible sheet comprising rubber and provided with slits in oppositely disposed edges thereof to form tabs adapted to interlock with each other, of a coating of adhesive upon said tabs whereby the sheet may be secured around a spring.

5. In a cover of the class described, in combination, a flexible sheet provided with tabs adapted to intermesh with each other, and to overlap and to be secured to the body of the sheet to secure said sheet upon a spring.

6. In a cover of the class described, in combination, a flexible sheet having a plurality of tabs on opposite edges, said tabs adapted to intermesh with each other and to overlap the body of said sheet for securing said tabs thereto to retain said sheet about a spring, and a flexible tube projecting through said sheet.

In testimony whereof, I have hereunto signed my name.

CHARLES D. ANDERSON.